Patented Oct. 8, 1929

1,730,537

UNITED STATES PATENT OFFICE

WINFIELD SCOTT, OF NITRO, WEST VIRGINIA, ASSIGNOR TO THE RUBBER SERVICE LABORATORIES COMPANY, OF AKRON, OHIO, A CORPORATION OF OHIO

MANUFACTURE OF A SUBSTITUTED GUANIDINE

No Drawing. Original application filed April 8, 1927, Serial No. 182,186. Divided and this application filed January 14, 1928. Serial No. 246,922.

The present invention relates to the manufacture and production of a new valuable product being chemically the p-di-methyl-amino-phenyl-p-phenetidyl-guanidine having the following formula:

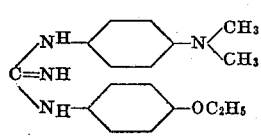

which new product is an accelerator of the rubber vulcanization process.

This compound has been prepared by reacting phenetidyl mustard oil with p-amino-di-methyl-aniline to produce a thiourea and then desulphurizing in any desired manner the thiourea so formed.

The intermediate thiourea compound desired was manufactured preferably by combining under reacting conditions, substantially 179 parts (one molecular proportion) of phenetidyl mustard oil with approximately 135 parts by weight (one molecular proportion) of p-amino-di-methyl-aniline. The reaction that took place is represented most conveniently as follows:

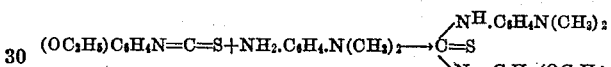

The resulting thiourea compound so obtained was then desulphurized in any desired manner but preferably by treatment with a lead compound while warming under pressure in the presence of ammonia. Preferably, the ammonia was employed in the form of an alcoholic solution thereof. The heating of the mix was continued for a period of time necessary to produce substantially complete combination of the substances whereupon the mass was allowed to cool, any excess pressure was released, and the reaction product was filtered. The residuum was then washed with a dilute acid such as hydrochloric acid to dissolve any guanidine derivative from unchanged thiourea which may remain in the product. The acid solution was then rendered slightly alkaline by the addition thereto of a suitable alkali, such as caustic soda and the precipitated guanidine derivative was then filtered and washed and combined with the product obtained from the alcoholic liquor. The product can be further purified, if necessary, by redissolving it again in an acid and precipitating as before with caustic. The resulting product, p-di-methyl-amino-phenyl-p-phenetidyl-guanidine, has the composition represented by the following formula:

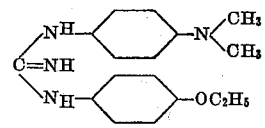

Having described this example of the invention, I do not wish to be understood as being limited to the exact proportions, ingredients, temperatures and steps set forth, for various changes may be made without departing from the essential features of my invention. The invention is limited solely by the claims attached hereto as a part of this specification wherein it is intended to claim the invention as broadly as is possible.

This case is a division of application Serial No. 182,186, filed April 8, 1927.

What I claim is:

1. The process of making p-di-methyl-amino-phenyl-p-phenetidyl-guanidine, which comprises reacting phenetidyl mustard oil with p-amino-di-methyl-aniline to produce a thiourea and then desulphurizing the thiourea so formed.

2. The process of making p-di-methyl-amino-phenyl-p-phenetidyl-guanidine, which comprises reacting phenetidyl mustard oil with p-amino-di-methyl-aniline to produce a thiourea and then desulphurizing the thiourea so formed by treatment with a lead compound while warming under pressure in the presence of ammonia.

3. The process of making p-di-methylamino-phenyl-p-phenetidyl-guanidine, which comprises reacting phenetidyl mustard oil with p-amino-di-methyl-aniline to produce a thiourea and then desulphurizing the thiourea so formed by treatment with a lead compound while warming under pressure in the presence of an alcoholic solution of ammonia.

4. The process of making p-di-methyl-amino-phenyl-p-phenetidyl-guanidine, which comprises reacting substantially equimolecular proportions of phenetidyl mustard oil and p-amino-di-methyl-aniline to produce p-di-methyl-amino-phenyl-p-phenetidyl thiouera, and then desulphurizing the thiourea so formed by treatment with a lead compound while warming under pressure in the presence of an alcoholic solution of ammonia, and isolating the p-di-methyl-amino-phenyl-p-phenetidyl guanidine thus formed.

5. As a new article of manufacture, a subtituted guanidine having the empirical formula $C_{17}H_{22}N_4O$, said guanidine containing the ethoxy-phenyl and the dimethyl-anilino groupings.

6. As a new article of manufacture p-di-methyl-amino-phenyl-p-phenetidyl-guanidine, having the formula

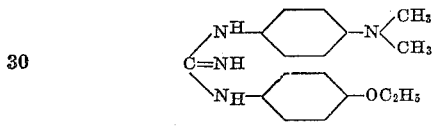

said product obtainable by reacting phenetidyl mustard oil with p-amino-di-methyl aniline to produce a thiourea and then desulphurizing the thiourea so formed in the presence of ammonia.

In testimony whereof I hereunto affix my signature.

WINFIELD SCOTT.